(12) United States Patent
Xue et al.

(10) Patent No.: US 11,180,607 B2
(45) Date of Patent: Nov. 23, 2021

(54) POLYESTERS WITH ULTRA-HIGH FLOWABILITY AND SUPERIOR STABILITY AND MELTBLOWN FIBERS THEREOF

(71) Applicant: CHANG CHUN PLASTICS CO., LTD., Taipei (TW)

(72) Inventors: Bo-Fan Xue, Taipei (TW); Tsai-Pang Huang, Taipei (TW); Yung-Sheng Lin, Taipei (TW)

(73) Assignee: Chang Chun Plastics Co., Ltd., Taipei (TW)

( * ) Notice: Subject to any disclaimer, the term of this patent is extended or adjusted under 35 U.S.C. 154(b) by 0 days.

(21) Appl. No.: 16/709,602

(22) Filed: Dec. 10, 2019

(65) Prior Publication Data

US 2021/0171707 A1    Jun. 10, 2021

(51) Int. Cl.
| | |
|---|---|
| *C08G 63/183* | (2006.01) |
| *D01D 5/098* | (2006.01) |
| *D01F 6/62* | (2006.01) |
| *D04H 1/435* | (2012.01) |

(52) U.S. Cl.
CPC ......... *C08G 63/183* (2013.01); *D01D 5/0985* (2013.01); *D01F 6/62* (2013.01); *D04H 1/435* (2013.01); *C08G 2350/00* (2013.01)

(58) Field of Classification Search
CPC .. D01D 5/0092; D01D 5/0076; D01D 5/0069; D01D 5/24; D01D 5/0985; B01J 19/0066; B01J 19/1812; B01J 2219/00168; B01J 2219/00202; B01J 2219/00207; B01J 4/008; C08G 2350/00; C08G 63/183; D01F 6/62; D04H 1/435; D04H 1/56; D04H 3/011; D04H 3/16
See application file for complete search history.

(56) References Cited

U.S. PATENT DOCUMENTS

| | | | |
|---|---|---|---|
| 3,951,886 A | 4/1976 | Miyake et al. | |
| 4,189,549 A | 2/1980 | Matsunaga et al. | |
| 5,582,907 A * | 12/1996 | Pall ................... | B01D 39/1623 |
| | | | 428/304.4 |
| 5,976,406 A | 11/1999 | Nagano et al. | |
| 8,308,833 B2 | 11/2012 | Takano et al. | |
| 2002/0025748 A1 | 2/2002 | Rudisill | |
| 2002/0028904 A1 * | 3/2002 | Dhawan ................. | C08G 63/78 |
| | | | 528/176 |
| 2002/0127939 A1 * | 9/2002 | Hwo ....................... | D04H 1/56 |
| | | | 442/347 |
| 2004/0214984 A1 * | 10/2004 | Keep .................... | C08K 5/1515 |
| | | | 528/359 |
| 2006/0270824 A1 | 11/2006 | Leemans et al. | |
| 2007/0232177 A1 * | 10/2007 | Imes .................... | D01D 5/0985 |
| | | | 442/400 |
| 2010/0146921 A1 * | 6/2010 | Takano .................. | B32B 27/36 |
| | | | 55/521 |
| 2017/0152616 A1 * | 6/2017 | Brown ..................... | D04H 1/70 |
| 2018/0201729 A1 * | 7/2018 | Alidedeoglu .......... | C08G 63/78 |

FOREIGN PATENT DOCUMENTS

| | | |
|---|---|---|
| CN | 106255722 A | 12/2016 |
| CN | 107849228 A | 3/2018 |
| EP | 3834925 * | 6/2021 |
| TW | 201942433 A | 11/2019 |

OTHER PUBLICATIONS

W. Borman Molecular Weight-Viscosity Relationships for Poly (1,4-butylene Terephthalate), Journal of Applied Polymer Science, vol. 22, 2119-2126 (1978). (Year: 1978).*
EP Search Report for Application EP 20 16 8551 (copending EPO Application ) dated Jul. 22, 2020 (Year: 2020).*
Chen et al "Fiber Diameter of Polybutylene Terephthalate Melt-Blown Nonwovens", Journal of Applied Polymer Science, vol. 97, 1750-1752 (2005) (Year: 2005).*

* cited by examiner

*Primary Examiner* — Ling Siu Choi
*Assistant Examiner* — Gennadiy Mesh
(74) *Attorney, Agent, or Firm* — Nixon Peabody LLP; Thomas P. Pavelko

(57) ABSTRACT

A polyester with ultra-high flowability and good stability over time is provided. The polyester can be polybutylene terephthalate (PBT) or another aliphatic polyester, whose intrinsic viscosity (IV) is less than 0.6 dL/g and a carboxylic end group (CEG) content is 15 meq/kg or less, and characterized by having a melt volume rate (MVR) of greater than 400 $cm^3/10$ min at 250° C. A resin composition of this polyester is provided, which can be meltblown into microfibers of a uniform diameter and a concentrated diameter distribution, forming a fabric with a uniform small pore size.

9 Claims, 8 Drawing Sheets

POLYESTERS WITH ULTRA-HIGH FLOWABILITY AND SUPERIOR STABILITY AND MELTBLOWN FIBERS THEREOF

FIELD OF INVENTION

The present disclosure relates to polyester with improved properties that can be processed into uniform fine fibers for various industrial applications.

BACKGROUND

In a meltblowing process, a non-woven web is formed by extruding molten polymer through a die and then attenuating and breaking the resulting filaments with a hot, high-velocity gas stream. This process generates fibers that can be collected on a moving belt where they may bond with each other during cooling, forming a web that exhibits barrier properties.

Meltblown fibers are typically made from polyester, polypropylene, polyethylene, polyamides, and polyurethanes. Conventional polyester polymers are not well adapted for making fine meltblown fibers. For example, conventional polybutylene terephthalate (PBT) crystallizes rapidly, often resulting in short mold cycles and relatively brittle fiber webs. Yet improving the flowability effectively allows for fabrication of finer fibers. Previous efforts by some researchers have attempted to improve the flowability of polyesters by adding additives to a polymer resin composition. However, adding additives leads to a widened fiber diameter distribution—the thickness of meltblown fibers becomes dispersed. Others have tried to produce polyesters with a high flowability but failed to achieve long-term flowability stability. Losing flowability over time, these polyesters will not produce meltblown fibers of a concentrated diameter distribution.

There is a need for polyesters with consistently high flowability. There is a further need for meltblown polyester fibers that have concentrated fine thickness, as well as composite structures of the meltblown fibers that have fine pore sizes and exhibit good barrier properties.

SUMMARY

A polyester with a high flowability and stability is provided. A polyester resin composition is also provided based on the polyester with the high flowability and stability. The polyester can be polybutylene terephthalate (PBT), polybutylene isophthalate (PBI), polyethylene terephthalate (PET), polyethylene isophthalate (PEI), polypropylene terephthalate (PPT), polypropylene isophthalate (PPI), polytrimethylene terephthalate (PTT), thermoplastic polyether ester elastomer (TPEE) or another aliphatic polyalkylene phenylene esters or a polyalkylene phenylene ester ether, whose intrinsic viscosity (IV) is 0.6 dL/g or less, melt volume rate (MVR) is greater than 400 cm$^3$/10 min at 250° C. with 2.16 kg load, having a carboxylic end group (CEG) content of 15 meq/kg or less relative to the weight of the polyester, a viscosity of less than 75 Pa·s measured at 245° C. under a shear rate of 1000 s$^{-1}$, a color coordinate b* between 0 and 1.2 on CIELAB color scale, or a combination thereof, and whose melt volume rate (MVR), melt flow rate, or melt index do not vary much over time, characterized by measurements over time having a standard deviation that is less than 4% relative to the mean value. In some embodiments, the polyester is produced by polycondensing 1,4-butanediol (BDO) and terephthalic acid (PTA) at a controlled environment where mixing motor current, gear pump motor current, liquid level, temperature, and/or pressure are tuned.

The disclosed polyester or its resin composition can give rise to microfibers of a uniform thickness. The uniform thickness is typically smaller in diameter and more concentrated in diameter distribution than fibers prepared under a comparable condition from a conventional polyester resin. For instance, meltblown fibers prepared from PBT resin with the low IV of less than 0.6 dL/g and the high and consistent MVR of 400 cm$^3$/10 min at 250° C. with 2.16 kg load, which over time has a standard deviation that is less than 4% relative to the mean value, are processed into fibers of a diameter of 1.46±0.23 μm, of a strength at cross machine direction of 0.30 kgf or greater per basis weight of 20 g/m$^2$, and of a strength at machine direction of 0.35 kgf or greater per basis weight of 20 g/m$^2$, or characterized as fitting a Gamma distribution of a shape parameter α being 8.5 and a scale parameter β being less than 0.2. Fibers made from the disclosed PBT resin are superior in concentrated diameter distribution, small diameter size, strength and/or elongation capability compared to fibers prepared with conventional PBT resin.

A sheet, a web, or a composite structure of the fibers is also provided based on the disclosed polyester with a high flowability and stability. In various embodiments, meltblown fibers of the disclosed polyester form a non-woven fabric of a smaller pore size and exhibit higher efficiency as a filter, compared to non-woven fabric of meltblown fibers made with conventional polyester resin. In one embodiment, the non-woven fabric of the meltblown fibers have an average pore size of about 10 μm and a maximal pore size of less than 20 μm.

The above summary is not intended to represent every embodiment or every aspect of the present disclosure. Rather, the foregoing summary merely provides an example of some of the novel aspects and features set forth herein. Other features and advantages of the invention will become apparent from the following detailed description, taken in conjunction with the accompanying drawings, which illustrate, by way of example, various features of embodiments of the invention.

BRIEF DESCRIPTION OF THE FIGURES

Exemplary embodiments are illustrated in referenced figures. It is intended that the embodiments and figures disclosed herein are to be considered illustrative rather than restrictive.

FIG. 10 is a graph showing flow rate over applied pressure for measurement of pore size of a membrane, filter, fabric and the like.

DETAILED DESCRIPTION

Figure 1:
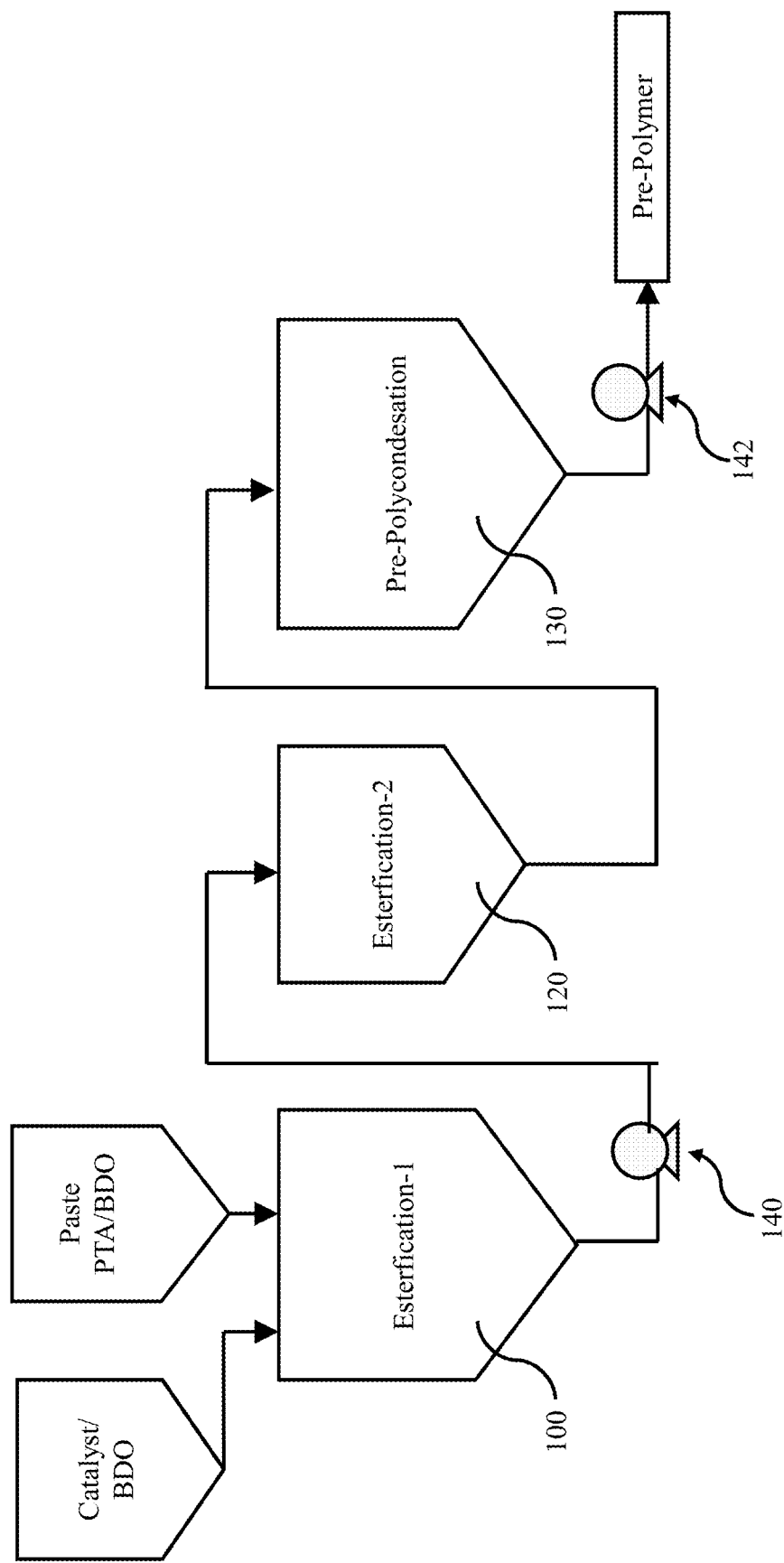
FIG. 1 is a schematic showing an exemplary process of forming a pre-polymer through esterification of PTA with BDO and prepolycondensation. A mixture of catalyst and BDO, and a paste containing PTA and BDO, are fed into a reaction vessel for esterification. A two-step esterification ("Esterification-1" and "Esterification 2") takes place in two reaction vessels 100 and 120, connected by gear pump 140, or in one vessel under two different esterification conditions. The first step or condition converts the reactants to a mixture with a carboxylic end group (CEG) content of less than 300 meq/kg, and the second step or condition results in a CEG content of less than 50 meq/kg. Subsequently, the resulting mixture is pre-polycondensed (e.g., in another container 130), and transferred by gear pump 142, leading to a pre-polymer with an intrinsic viscosity (IV) in the range between 0.21 dL/g and 0.33 dL/g and a CEG content of less than 15 meq/kg.
Figure 2:
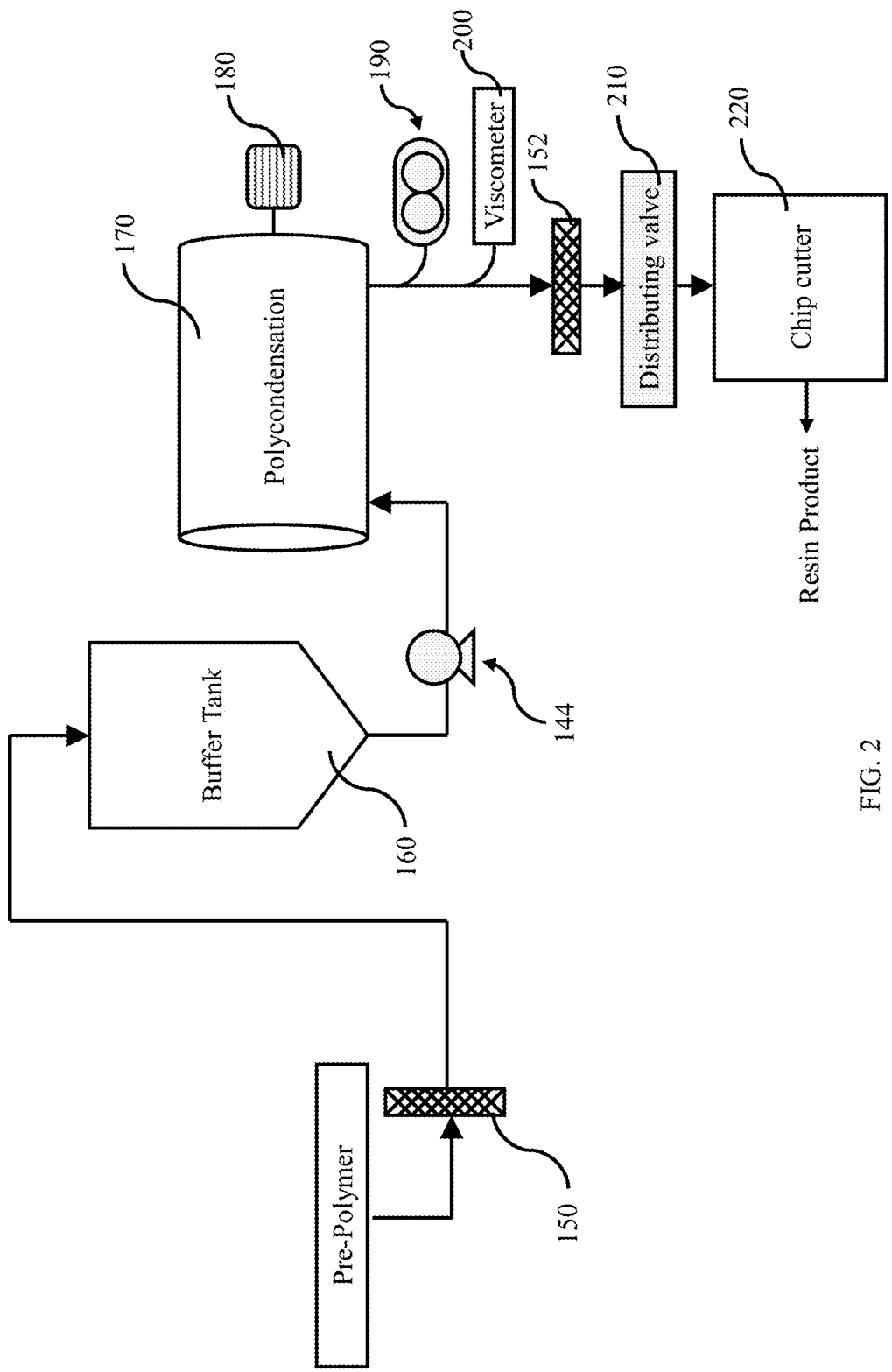
FIG. 2 is a schematic showing an exemplary process of making a polyester resin from a pre-polymer as shown in FIG. 1. A pre-polymer with an IV between 0.21 dL/g and 0.33 dL/g and a CEG content of less than 15 meq/kg is passed through a filter 150 to remove coke and/or pyropolymer, and fed into a buffer tank 160, and subsequently transferred by gear pump 144 into a mixer 170 where the polycondesation takes place. The mixer 170 is connected to a motor 180, a gear pump 190 and a viscometer 200, where electric current of the motor 180 and the gear pump 190, and thereby the stirring in the mixer 170, is well controlled such that the viscosity of reaction in the mixer 170 is maintained at a specific viscosity such as 75 Pa·s (measured at 245° C. under a shear rate of 1000 $s^{-1}$) with a standard deviation <1. The resulting polycondensed composition is passed through a filter 152 to remove coke and/or pyropolymer and subsequently fed through a distributing valve 210 and cut by a chip cutter 220, resulting in a polybutylene terephthalate (PBT) resin with an IV<0.6 dL/g, a CEG content <10 meq/kg, and a melt volume rate (MVR) of greater than 400 $cm^3$/10 min (measured at 250° C. with a 2.16 kg load) that is stable over time, as represented by a standard deviation that is less than 4% of the mean MVR.
Figure 3:
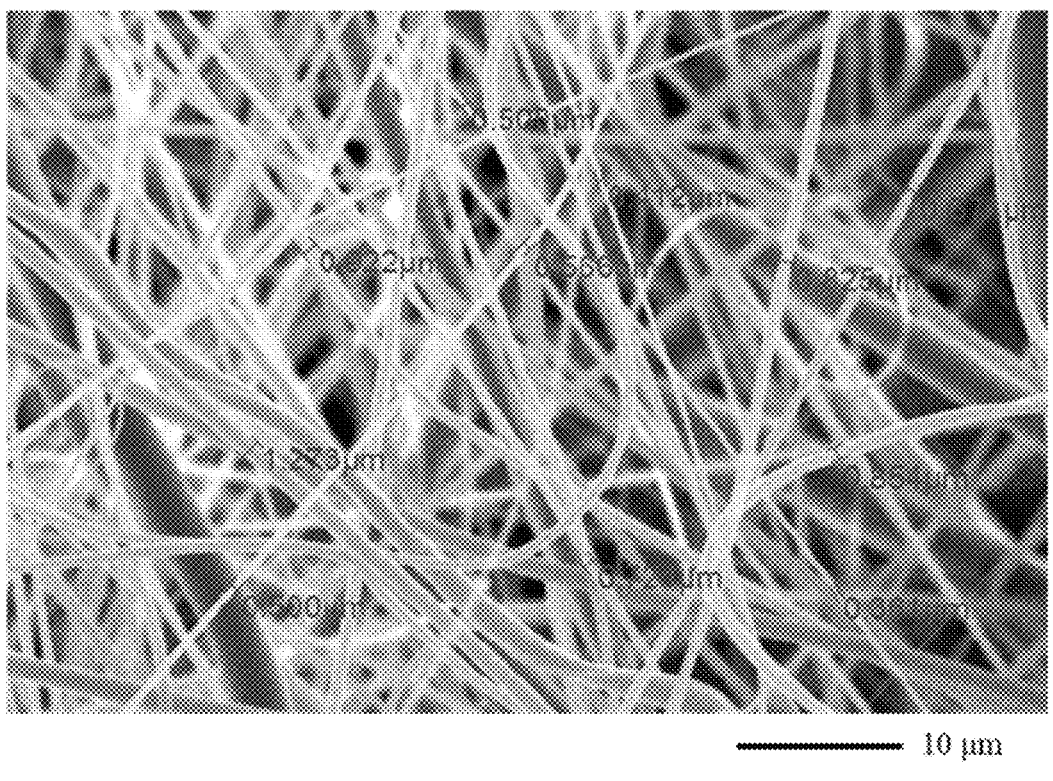
FIG. 3 is a scanning electron microscopic image of fibers prepared using the PBT resin of FIG. 2 via melt-blowing under one set of parameters (condition A detailed below).

The term "polymer" generally includes homopolymers, copolymers (such as for example, block, graft, random and alternating copolymers), terpolymers, and blends and modifications thereof. Furthermore, unless otherwise specifically limited, the term "polymer" shall include all possible geometrical configurations of the material. These configurations include isotactic, syndiotactic and random symmetries.

The term "polyester" is intended to embrace polymers wherein at least 85% of the recurring units are condensation products of dicarboxylic acids and dihydroxy alcohols with polymer linkages created by formation of an ester unit. This includes aromatic, aliphatic, saturated, and unsaturated diacids and di-alcohols. The term "polyester" also includes copolymers (such as block, graft, random and alternating copolymers), blends, and modifications thereof. An example of a polyester is PBT which is a condensation product of BDO and PTA.

The term "meltblown fibers" refers to fibers formed by extruding a molten thermoplastic polymer through a plurality of fine, usually circular, capillaries as molten threads or filaments into a high velocity gas (e.g. air) stream. The high velocity gas stream attenuates the filaments of molten thermoplastic polymer material to reduce their diameter to between about 0.5 and 10 microns. Meltblown fibers are generally discontinuous fibers. Meltblown fibers carried by the high velocity gas stream are normally deposited on a collecting surface to form a web of randomly dispersed fibers.

The term "non-woven fabric, sheet or web" refers to a structure of individual fibers or threads that are positioned in a random manner to form a planar material generally without an identifiable pattern.

The "machine direction" refers to the long direction within the plane of a sheet, i.e., the direction in which the sheet is produced. The "cross machine direction" refers to the direction within the plane of the sheet that is perpendicular to the machine direction.

Various embodiments provide polyesters having a low viscosity and a consistent, high flowability over time. Some aspects provide polyesters having an IV of less than 0.6 dL/g. Some aspects provide polyester having a MVR of greater than 400 $cm^3$/10 min (measured at 250° C. with a 2.16 kg load). Yet some aspects provide polyesters having a MVR of greater than 400 $cm^3$/10 min (measured at 250° C. with a 2.16 kg load) over a period of time and a difference over time, if any, in the MVR is less than 4% relative to the mean value of the MVR.

In one embodiment, the polyester is a PBT. In another embodiment, the polyester is an aromatic polyester produced by polycondensing PTA or dimethyl terephthalate with BDO. Yet another embodiment provides the polyester is a thermoplastic polyester produced by polycondensing PTA with BDO at a molar ratio in the range of 1:1.1 to 1:1.4 or greater (BDO is at least 40% greater in mole than PTA) at a pressure of 5 mbar or less, 4 mbar or less, 3 mbar or less, or 2 mbar or less in a reactor whose fluid level height is no more than 30% covered with reactants in a controlled mixing manner such that the viscosity of the produced polyester is less than 75 Pa·s (measured at 245° C. under a shear rate of 1000 $s^{-1}$) with a standard deviation of less than 1 and the CEG content is 15 meq/kg or less. Yet other embodiments provide the polyester is a mixture including at least 99%, 98%, 97%, 96%, 95%, 94%, 93%, 92%, 91%, 90%, 85%, 80%, 75%, or 70% purity (or by weight) of PBT, whose overall IV is in the range of 0.3 to 0.6 dL/g, CEG content is 15 meq/kg or less relative to the weight of the polyester, and viscosity is 75 Pa·s or less measured at 245° C. under a shear rate of 1000 $s^{-1}$.

Other embodiments provide the polyester is PET, PEI, PPT, PPI, PTT, PTI, PBT, PBI, a TPEE (e.g., polyethylene-p-phenylene ester ether, polyethylene-m-phenylene ester ether, polyethylene-o-phenylene ester ether, polytrimethylene-p-phenylene ester ether, polytrimethylene-m-phenylene ester ether, polytrimethylene-o-phenylene ester ether, polybutylene-p-phenylene ester ether, polybutylene-m-phenylene ester ether, polybutylene-o-phenylene ester ether), or a mixture or copolymer thereof. Yet other embodiments provide aliphatic polyesters that include the polyalkylene phenylene esters and polyalkylene phenylene ester ethers of the following formula:

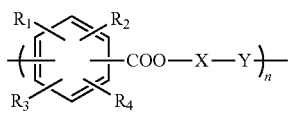

wherein $R_1$, $R_2$, $R_3$ and $R_4$ are the same or different and are each hydrogen, an alkyl having 1 to 6 carbon atoms (e.g., methyl, ethyl, n-propyl, isopropyl), a halogen (e.g., fluorine, bromine, chlorine), an alkoxy having 1 to 6 carbon atoms (e.g., methoxy, ethoxy), an alkoxycarbonyl having 2 to 6 carbon atoms (e.g., methoxycarbonyl, ethoxycarbonyl), cyano, amino, sulfonyl, nitro or phenoxy; X is a divalent aliphatic hydrocarbon group having 1 to 10 carbon atoms (e.g. methylene, dimethylene, trimethylene, tetramethylene, pentamethylene, hexamethylene, heptamethylene, octamethylene, nonamethylene, decamethylene, ethylene, propylene, methyltrimethylene, butylene); Y is —OCO— or —O—; and n is an integer between 30 and 500 (e.g., between 100 and 200, or between 50 and 70).

Some embodiments provide a disclosed polyester has an IV between 0.6 dL/g and 0.55 dL/g, between 0.55 dL/g and 0.5 dL/g, between 0.5 dL/g and 0.45 dL/g, between 0.45 dL/g and 0.4 dL/g, or any range in between, such as between 0.4 dL/g and 0.6 dL/g; and having a MVR measured at 250° C. with 2.16 kg load between 400 cm$^3$/10 min and 500 cm$^3$/10 min, between 500 cm$^3$/10 min and 600 cm$^3$/10 min, between 600 cm$^3$/10 min and 700 cm$^3$/10 min, between 700 cm$^3$/10 min and 800 cm$^3$/10 min, between 800 cm$^3$/10 min and 900 cm$^3$/10 min, between 900 cm$^3$/10 min and 1000 cm$^3$/10 min, between 1000 cm$^3$/10 min and 1100 cm$^3$/10 min, between 1100 cm$^3$/10 min and 1200 cm$^3$/10 min, between 1200 cm$^3$/10 min and 1300 cm$^3$/10 min, any range in between, or greater than 1300 cm$^3$/10 min. In further embodiments, a disclosed polyester has a viscosity of 75 Pa·s or less, 70 Pa·s or less, 65 Pa·s or less, 60 Pa·s or less, or in a range of 40 to 45 Pa·s, 45 to 50 Pa·s or less, 50 to 55 Pa·s or less, 55 to 60 Pa·s or less, 60 to 65 Pa·s or less, 65 to 70 Pa·s or less, or 70 to 75 Pa·s or less, with a standard deviation of less than 1.

Various embodiments provide that a disclosed polyester maintains its flowability over time, e.g., the flowability does not substantially decrease over time, also phrased as stability over time. A polyester with stability in the high flowability allows for processing such as in a meltblowing process under a consistent, amenable condition to produce products such as meltblown fibers of a concentrated shape and/or thickness with a narrow distribution. In several aspects, a disclosed polyester has a stability in flowability as characterized by two or more measurements of MVR, melt flow rate or melt index at different times do not vary significantly over time, e.g., with a standard deviation being less than 4%, 3.9%, 3.8%, 3.7%. 3.6%, 3.5%, 3.4%, 3.3%, 3.2%, 3.1%, 3%, 2.9%, 2.8%, 2.7%, 2.6%, 2.5%, 2.4%, 2.3%, 2.2%, 2.1% or 2% relative to the mean value of the MVR, melt flow rate or melt index. In another aspect, a disclosed polyester whose MVR is measured at various times (e.g., about 0.5 hour, 1 hour, 2 hours, 3 hours, 4 hours, 5 hours, 6 hours, 7 hours, 8 hours, 9 hours, 10 hours, 11 hours, 12 hours, or 1 day apart, or further) has a mean value that is at least 25 times greater than the mean value.

Further embodiments provide that a disclosed polyester has a CEG content of no more than 15 meq/kg, less than 14 meq/kg, less than 13 meq/kg, less than 12 meq/kg, less than 11 meq/kg, or less than 10 meq/kg, relative to the weight of the polyester. In further aspects, a disclosed polyester has a CEG content in a range between 5 and 15 meq/kg, between 7 and 13 meq/kg, or between 8 and 12 meq/kg, relative to the weight of the polyester.

The disclosed polyesters having a low CEG content is more resistant to hydrolysis than conventional polyesters with a higher CEG content. The disclosed polyesters and processed products of the polyesters, such as meltblown fibers made with PBT of a low CEG content, are more durable as a filter for fluid and display less weakness when attacked by water or moisture, particularly at elevated temperatures, compared to conventional polyesters with a higher CEG content. Conventional polyesters with a high CEG content are easily degraded in a high-temperature, high-humidity environment, leading to low mechanical strength.

Further aspects of the disclosed polyesters have a weight average molecular weight in a range of 20,000 to 30,000 g/mol, 30,000 to 40,000 g/mol, or 40,000 to 50,000 g/mol, or any range in between. In one aspect, the disclosed PBT has a weight average molecular weight in a range of 25,000 to 45,000 g/mol. In further aspects, the disclosed polyesters have number average molecular weight in a range of 10,000 to 18,000 g/mol.

Various embodiments provide a polyester resin composition including a disclosed polyester. In several aspects, a polyester resin composition includes at least 99%, 98%, 97%, 96%, 95%, 94%, 93%, 92%, 91%, 90%, 85%, 80%, 75%, 70%, or 60% purity (or by weight) of one or more herein disclosed polyesters with the flowability and stability. The disclosed polyester resin has excellent processibility and stability.

In further embodiments, a disclosed PBT, or its resin or composite, further includes one or more additives, modifiers or reinforcing agents to provide broad property profiles. Exemplary additives include stabilizers (e.g., ultraviolet absorbers), antioxidants, heat stabilizers, lubricants, mold release agents, catalyst deactivators, nucleating agent, crystallization accelerators or the like.

The polyester resin composition can be produced by mixing uniformly the components (monomers for esterification, and/or pre-polymers for polycondensation) in a controlled manner in a mixing machine, for instance a roll mill, a BANBURY® mixer, or an extruder. An exemplary controlled manner in the mixing includes maintaining a controlled fluid level in the machine (e.g., no more than 35%, 30%, 25%, or 20%), a controlled viscosity of the mixture (e.g., no more than 75 Pa·s), and a controlled current for a continuous agitation of the reaction mixture.

In many aspects, a disclosed polyester resin composition has a color coordinate b* between 0 and 1.2, L* between 90 and 95, or both on the CIELAB color scale. In some aspects, the disclosed polyester resin composition may further include one or more coloring agents such as pigments and dyes for aesthetic reasons or for protection from light.

The polyester resin composition (e.g., PBT, PBI, or a mixture thereof) has various utilities, for instance, as electric or electronic parts (e.g., connector, parts of hair dryer, flexible printed circuit, parts of color television, etc.), mechanical parts (e.g., cover of motor, housing for electric tool, impeller for pump, parts for motorcar), as helmets, baths, containers for drugs and foodstuffs, parts of cigarette lighters, or the like. Various embodiments of the polyester resin composition are processed into fine, consistent fibers to form sheets and/or webs of fibers as a filter, barrier, or sound insulator.

The disclosed polyesters give meltblown fibers of a fine thickness and concentrated distribution. In other words, the disclosed polyester resin composition with a low IV of less than 0.6 dL/g and a consistently high MVR of greater than 400 cm$^3$/10 min at 250° C. with a 2.16 kg load can be meltblown into micro-sized fibers with a narrow distribution (e.g., fitting a Gamma distribution of a scale of less than 0.2 when a shape (a) is 8.5).

In some embodiments, melt-blowing feedstock is loaded into a conventional melt-blowing apparatus and extruded in the ordinary manner. A typical melt-blowing device is pictured, for example, in U.S. Pat. No. 4,970,529, the entire disclosure of which is incorporated herein by reference. The feedstock is melted in the extruder portion of the apparatus and fed to a die. The molten polymer is then extruded from a plurality of spinning orifices typically arranged in a straight line on a spinneret. A heated high pressure gas, typically air, is simultaneously injected at high velocity through slits arrange on both sides of the orifices to blow streams of molten polymer. The molten polymer is drawn, thinned and set to the shape of a microfiber by the action of the moving gas stream. The fibers are collected on a screen circulating between a pair of rollers to form a random web.

Various embodiments provide a fiber or a plurality of fibers prepared with the disclosed polyesters, wherein each fiber has a diameter or thickness in the range of 1 to 1.2 μm, 1.2 to 1.4 μm, 1.4 to 1.6 μm, or any range in between. In one aspect, the fiber is a PBT fiber of a diameter of less than 1.7 μm. In another aspect, the fiber is a meltblown fiber of PBT of a diameter of less than 1.7 μm.

In some embodiments, a pre-dried polyester resin composition as disclosed above is melted at 270° C. and extruded at a rate of 0.131 g/hole/min through a die of 0.3 mm opening into blowing hot air of 290° C. at 5.3 m$^3$/min, forming strands of fibers. In other embodiments, a disclosed polyester resin is melted at about 260 to 280° C., 250 to 290° C., or another temperature that melts the polymer to allow for extrusion in a meltblowing process. The extrusion rate, the die opening size, the hot air temperature and blowing speed, as well as the distance between a die to a collector and the speed of the collector, may each be tuned to differ from the above-mentioned for about 3%, 5%, 10%, 15% or 20%, or another value, so long as fibers are produced in the process. In a further aspect, a pre-dried PBT resin composition (e.g., by at least 5 hours at 100° C. or greater) is melted at about 270° C. and extruded through a die of an opening of about 0.3 mm at a speed of about 0.13 g/min/die with an attenuation air at a temperature of about 290° C. and an air flow of about 5.3 m$^3$/min, and collecting the extruded, attenuated PBT on a conveyor belt about 10 cm away from the die, the conveyor belt revolving at about 8 m/min.

One embodiment provides that a plurality, sheet or web of fibers comprising or consisting of a disclosed polyester has an average fiber diameter of about 1.5 μm, or in a range of 1.35 to 1.55 μm, and the fiber diameter distribution of the plurality, sheet or web of fibers fits a narrow distribution, e.g., indicated by a Gamma distribution of a scale (β) of 0.2 or less. Further embodiments provide that the plurality, sheet or web of fibers are in the form of a non-woven fabric having a maximal pore size of about 19 μm (or in a range of 18 to 20 μm) in a bubble point measurement and a mean flow pore size of about 10 μm (or in a range of 8 to 11 μm) in a mean flow measurement. Yet another embodiment provides a plurality, sheet or web of fibers comprising or consisting of the disclosed polyester, wherein more than 90% of the fibers have a diameter in the range of 0.5 to 2.0 μm and less than 10% of the fibers have a diameter in the range of 2.0 to 3.5 μm. This is unlike meltblown fibers prepared from a conventional resin under a same meltblowing condition, where the conventional resin gives fibers with a more dispersed diameter distribution, characterized as less than 70% of the conventional fibers having a diameter in the range of 0.5 to 2.0 μm and more than 30% of the conventional fibers having a diameter in the range of 2.0 to 3.5 μm.

In another embodiment, a disclosed polyester resin composition whose IV is less than 0.6 dL/g, MVR is 400 cm$^3$/10 min or greater (measured at 250° C. with a load of 2.16 kg) and CEG content of 15 meq/kg or less relative to the weight of the polyester, gives meltblown fibers of an average diameter (or thickness) of 1.46 μm±0.34 μm. A further aspect of this embodiment provides that the strength of the meltblown fibers is greater than 0.30 kgf at cross machine direction and greater than 0.35 kgf at machine direction per basis weight of 20 g/m$^2$; and the elongation of the meltblown fibers is greater than 50% at cross machine direction and greater than 10% at machine direction per basis weight of 20 g/m$^2$. Yet another further aspect of this embodiment provides that the fibers are in the form of a non-woven fabric having small pore size, characterized by a maximal pore size of about 16 to 20 μm in a bubble point measurement and an average pore size of about 9 to 12 μm.

The disclosed polyester resin composition and its meltblown fibers are superior in the uniformity of small diameters (a concentrated rather than dispersed distribution), in strength, and/or in elongation capability, than fibers of a conventional polyester resin that is meltblown and collected under a comparable processing condition. In further aspects, one or more of the superiority/improvements by the disclosed polyester resin composition and its meltblown fibers are better by at least 5%, 10%, 15%, 20%, 25%, 30%, 40%, or 50% compared to a conventional polyester resin or its meltblown fibers independently in one or more aspects; and the superiority/improvements include aspects of high flowability characterized by high MVR of the resin, high stability characterized by small variations of MVR over time of the resin, small diameter and narrow distribution of diameter of meltblown fibers prepared from the resin, and improved filtration efficiency/effectiveness of membrane prepared with the meltblown fibers.

Generally speaking, the smaller fiber diameter can lead the smaller pore size of non-woven fabric, and the filtering effect will be better. In addition, if the fiber diameter distribution is concentrated, the microstructure of non-woven fabric will be more uniform. Consequently, the high accuracy of filtration can be obtained by more uniform pore size. In one embodiment, a non-woven fabric including microfibers made from a disclosed PBT resin has more than 40% of the pore sizes between 9 μm and 11 μm, where the PBT resin has an IV of 0.6 dL/g or less, a MVR of 400 cm$^3$/10 min or greater at 250° C. with 2.16 kg load and a CEG content of 15 meq/kg or less (or more preferably 10 meq/kg or less) relative to the weight of the PBT resin. This is unlike a non-woven fabric including microfibers made from a conventional resin under an identical melt blowing process, where the conventional resin produces a fabric that has less than 10% pore sizes between 9 μm and 11 μm or less than 20% pore sizes between 8 μm and 12 μm.

Sheets, webs, or composite structures including the sheets or webs of fibers can be further processed after collection or assembly to increase web strength, provide a patterned surface, and fuse fibers at contact points in a web structure or the like; orientation to provide increased web strength; needle punching; heat or molding operations; coating, such as with adhesives to provide a tape structure; or the like.

A filter, typically a multi-layer filter, is further provided, which includes at least one layer of meltblown non-woven fabrics of the fibers. Meltblown non-woven fabric is one kind of depth filter with the three-dimensional network-like microporous structure. Generally by increasing the layers of filter media, filtration efficiency can be improved, but the filter resistance is also increased accordingly. In the case where the number of layers (or the thickness) is fixed, the smaller fiber diameter can greatly improve the filtration efficiency without increasing the resistance.

Test Methods

In the description above and in the examples that follow, the following test methods were employed to determine various reported characteristics and properties. ASTM refers to the American Society for Testing and Materials, ISO stands for the International Organization for Standardization, and CNS refers to the National Standards of the Republic of China.

Intrinsic Viscosity (IV) is a measure of the inherent resistance to flow for a polymer solution and was determined by ASTM D2857, which is hereby incorporated by reference, and is reported in dL/g. The solvent and temperature used to study the IV of the presently disclosed polyester (e.g., PBT) in a glass capillary viscometer was o-chlorophenol at a polymer concentration of 1 g/dL (or 0.2 g polyester/20 mL solvent) at 35° C.

Figure 9:
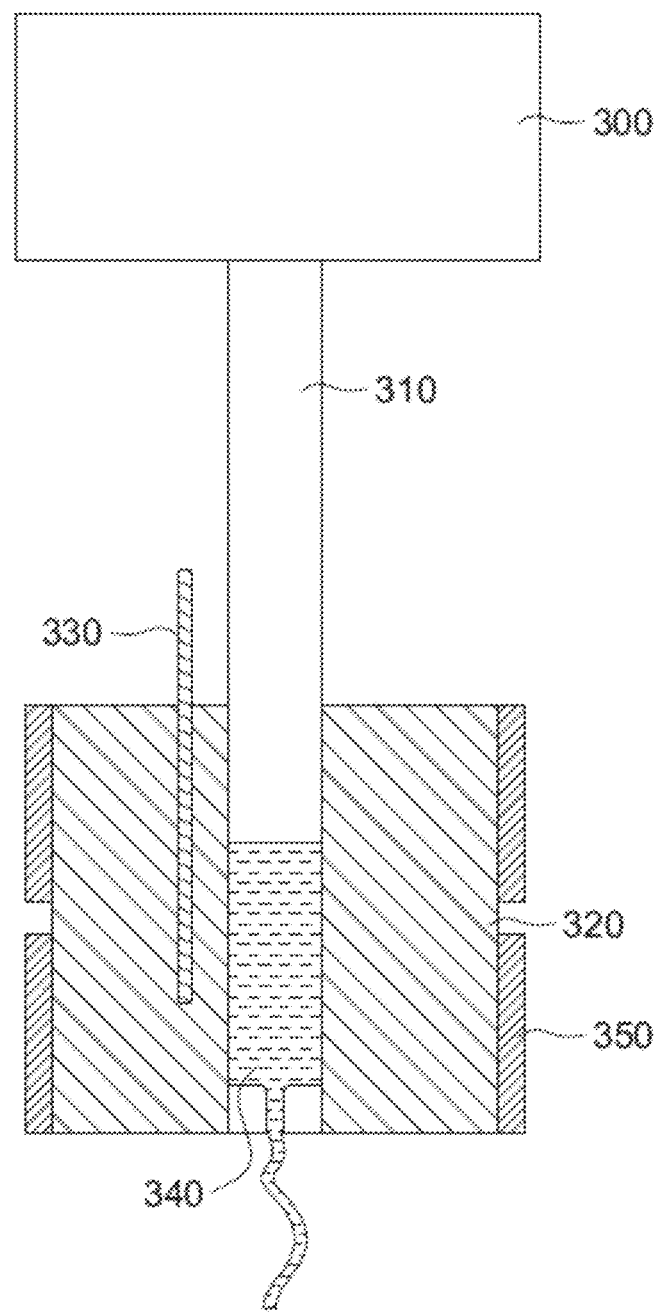
FIG. 9 is a diagram of a melt indexer for testing the melt volume rate (MVR) of a polyester resin. A heated barrel 320 having an inner cylindrical void space 340 where a sample of the polyester resin is placed and can contact a piston 310, and a specified load 300 is applied to the piston 310, such that the melted polymer is extruded through a capillary die. The heated barrel 320 has a temperature control jacket 350 on the exterior, such that the temperature of the barrel and the polyester resin placed in the barrel is maintained at a desired temperature for the test, indicated by a thermometer 330 (e.g., a platinum resistant thermometer, PRT).

Melt volume rate (MVR) is a measure of the viscosity of a polymer in the melt phase and was determined by D1238 or ISO R1133, which is hereby incorporated by reference, and is reported in cm$^3$/10 min. FIG. 9 and its description details the machine and temperature used to study the MVR of the presently disclosed polyesters.

Fiber Diameter was measured via scanning electron microscopy and is reported as an average value in microns of a large number of fibers, e.g., a number of 110 fibers.

Basis Weight is a measure of the mass per unit area of a fabric or sheet and was determined by CNS 5610-1, which is hereby incorporated by reference, and is reported in g/m$^2$.

Weight Average Molecular Weight (Mw) was measured using gel permeation chromatography system. The molecular weight averages for a disclosed polyester (e.g., PBT) were determined in a mixture of chloroform and hexafluoro-2-propanol at 9:1 (v:v) using an injection volume of 10 microliters operating at 0.8 mL/min flow rate at 35° C.

Number Average Molecular Weight (Mn) was measure using gel permeation chromatography system. The molecular weight averages for PBT were determined in a mixture of chloroform and hexafluoro-2-propanol at 9:1 (v:v) using an injection volume of 10 microliters operating at 0.8 mL/min flow rate at 35° C.

Carboxylic end group (CEG) content, also referred to as CEG concentration, was measured by titration. A solution of the polyester dissolved in o-cresol, including potassium chloride (KCl) at a concentration of 0.01 M in the solution, was titrated with ethanolic potassium hydroxide solution (potassium hydroxide concentration at 0.05 M).

Viscosity was determined by ISO 11443 or ASTM D3835 standard, which is hereby incorporated by reference, and is reported in Pa·s.

Strength, or grab tensile strength, is a measure of the breaking strength of a sheet of fibers and was determined by ASTM D5034 standard which is hereby incorporated by reference, and is reported in Newtons or in kilogram·force. On earth's surface, 1 kgf is about 9.8 N.

Figure 10:
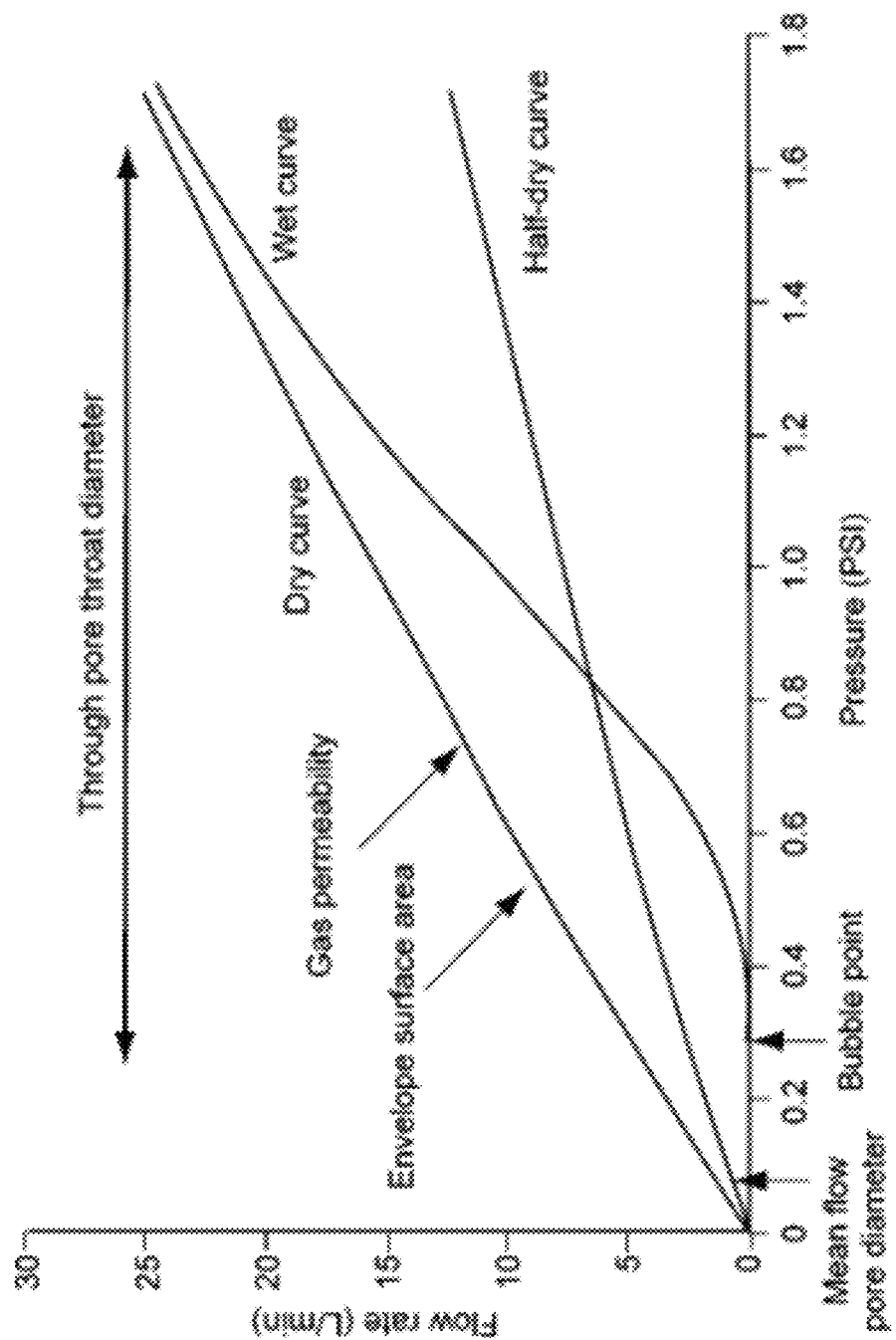

Pore size is a measure of the structure and filtering/permeability properties of a membrane, filter, fabric and the like and was measured using the PMI Bubble Point Tester. A membrane's largest through-pore (bubble point) was determined in GALWICK™ as the wetting liquid, whose surface tension was 15.9 dynes/cm at 25° C., and computed by this formula:

$$D = \frac{4\gamma \cos\theta}{P},$$

where D is the pore size, P is the transmembrane pressure, γ is the surface tension of the liquid, contact angle between liquid and membrane surface θ=0°. A "wet curve" represents measured gas flow against the applied pressure; and the gas flow against the applied pressure on the dry sample, "dry curve", is also measured. "Wet curve" and "dry curve" are shown in FIG. 10. Mean flow pore diameter is the pore size at which 50% of the total gas flow can be accounted. Measuring multiple samples of the membranes result in a distribution of the pore size.

It should be understood within the scope of the present disclosure, the above-mentioned technical features and technical features mentioned below (such as examples) can be combined freely and mutually to form new or preferred technical solutions, which are omitted for brevity.

Examples

Typically, a feed of a mixture of catalyst (e.g., titanium-based catalyst) and BDO containing a titanium content of 50-120 ppm and at a temperature 120-140° C. and a feed of a paste containing purified PTA and BDO at a molar ratio between 1:1.1 and 1:1.4 and at a temperature 60-80° C. are fed into a vessel 100 for a first step of esterification, carried out at a temperature 235-245° C. and a pressure at 900 mbar absolute for 1-1.5 hour, resulting in a CEG content in the mixture of less than 300 meq/kg. The second step of esterification was carried out at a temperature 235-245° C. and a pressure 400-450 mbar absolute for 0.3-0.8 hour, resulting in a CEG content in the mixture of less than 50 meq/kg. Subsequently, pre-polycondensation was carried out at a temperature 240-250° C. and a pressure 15-25 mbar for 30-45 min to form a pre-polymer that had an intrinsic viscosity (IV) between 0.21 dL/g and 0.33 dL/g with CEG content of less than 15 meq/kg (FIG. 1). The pre-polymer was filtered to remove coke and/or pyropolymer and fed into a buffer tank at 225-235° C. for 10-20 min, and the polycondensation took place at 235-245° C. under a pressure of less than 5 mbar, later cooled to room temperature for further polycondensation for 3-5 hours. The fluid level in the mixer 170 for polycondensation was kept below a threshold (e.g., <50%) for sufficient mixing, and the electric current of the mixer motor was tuned and maintained at a fine value (e.g., variation less than 0.03 standard deviation) for the duration of the polycondensation reaction to obtain PBT that had a viscosity of 75 Pa·s (standard deviation <1) measured at 245° C. under a shear rate of 1000 s$^{-1}$, an IV of 0.6 dL/g or less, and a CEG content of 15 meq/kg or less relative to the weight of the PBT. After filtering to remove coke and/or pyropolymer, the PBT was cut to obtain resin.

Four PBT resins, "Examples" 1-4 in Table 1, were prepared.

A first PBT resin, Example 1 in Table 1, was prepared with a feed of PTA:BDO (n:n)=1:1.38 and a titanium content of 70 ppm, premixed at ta temperature of 80° C., which was fed into a vessel for esterification at 244° C. Subsequently, pre-polymerization was carried out at 245° C. under 20 mbar; and the polycondensation was later carried out at 240° C. under 1.4 mbar for 4.5 hours.

A second PBT resin, Example 2 in Table 1, was prepared with a feed of PTA:BDO (n:n)=1:1.38 and a titanium content of 70 ppm, premixed at ta temperature of 80° C., which was fed into a vessel for esterification at 244° C. Subsequently, pre-polymerization was carried out at 245° C. under 20 mbar; and the polycondensation was later carried out at 241° C. under 1.4 mbar for polycondensation for 4.2 hours.

A third PBT resin, Example 3 in Table 1, was prepared with a feed of PTA:BDO (n:n)=1:1.38 and a titanium content of 70 ppm, premixed at ta temperature of 80° C., which was fed into a vessel for esterification at 244° C. Subsequently, pre-polymerization was carried out at 245° C. under 20 mbar; and the polycondensation was later carried out at 242° C. under 1.4 mbar for polycondensation for 3.8 hours.

same conditions mentioned above but controlling their viscosity of 90 and 95 Pa·s. Detail of "Comparative Examples" is summarized in Table 1.

The PBT resin was analyzed for its flowability of the melt using Melt Indexer based on the standard in ASTM D1238 or in ISO R1133 (FIG. 9), the acidity by titration, the IV following the standard in ASTM D2857, and its color based on the L*a*b* color system (e.g., described in JIS Z 8729; or CIELAB color space defined by the International Commission on Illumination (CIE)).

The PBT resin was further processed via melt blowing into fibers and non-woven fabrics. The melt-blowing process was a one-step process that converted the polybutylene terephthalate (PBT) resin with the above-mentioned properties into a web of non-woven, small-diameter fibers. The melt of PBT resin was extruded through small nozzles/dies that were surrounded by high-speed blowing gas. And the extrudate was collected on a conveyer belt and formed a sheet of non-woven fabric.

In one example, the melt blowing was carried out with the following parameters, "condition A": drying the PBT resin at 100° C. for 5 hours, the die size 0.3 mm in diameter, the melt polymer at 270° C., air of 290° C. was blowing at 5.3 m$^3$/min, the polymer flow rate was 0.131 g/hole/min, and the distance between the die and the collector is 10 cm, where the collector was a convey belt winding at a speed 8 m/min.

TABLE 1

A comparison of properties between Examples 1-4 (presently disclosed PBT resin) and Comparative Examples 1-4 (conventional resin), and the meltblown fibers made therewith, respectively.

| | Examples | | | | Comparative Examples | | | |
|---|---|---|---|---|---|---|---|---|
| | 1 | 2 | 3 | 4 | 1 | 2 | 3 | 4 |
| IV(dL/g) | 0.58 | 0.55 | 0.52 | 0.48 | 0.61 | 0.62 | 0.63 | 0.64 |
| CEG (meq/kg) | 11.4 | 9.3 | 9.69 | 8.93 | 9.79 | 12.37 | 14.19 | 14.03 |
| L* | 91.1 | 91.6 | 90.3 | 92.2 | 88.62 | 89.51 | 89.52 | 88.65 |
| b* | 1.18 | 0.96 | 1.06 | 0.89 | 1.96 | 1.24 | 1.23 | 1.46 |
| Mw | 42244 | 35810 | 32445 | 28795 | 43502 | 43888 | 48423 | 50676 |
| Mn | 15712 | 14277 | 13425 | 12357 | 15960 | 16533 | 18200 | 18632 |
| PDI | 2.689 | 2.508 | 2.417 | 2.33 | 2.726 | 2.655 | 2.715 | 2.72 |
| MVR (250° C.) | 480 | 700 | 900 | 1100 | 375 | 330 | 300 | 270 |
| MI (250° C.) | 550 | 780 | 1000 | 1200 | 420 | 360 | 330 | 300 |
| S.D. of MVR | 15.86 | 25.32 | 30.65 | 35.25 | 18.82 | 14.38 | 27.25 | 17.8 |
| MVR/S.D. of MVR | 30.27 | 27.65 | 29.36 | 29.78 | 19.92 | 22.94 | 11.01 | 15.17 |
| Scale (α = 8.5) | 0.1718 | 0.1792 | 0.1732 | 0.1809 | 0.2116 | 0.2674 | 0.3224 | 0.2342 |
| Avg. fiber diameter (μm) | 1.46 | 1.523 | 1.472 | 1.538 | 1.799 | 2.273 | 2.74 | 1.9 |
| B.P. pore size (μm) | 18.9885 | 15.7107 | 15.0823 | 15.8048 | 23.3576 | 17.9551 | 25.8764 | 21.6344 |
| M.F. pore size (μm) | 10.5903 | 10.2273 | 9.7851 | 9.0178 | 14.6877 | 12.2062 | 14.8914 | 13.0649 |
| Distribution | O | O | O | O | X | X | X | X |
| Filtration efficiency | O | O | O | O | X | X | X | X |

"MI" = melt index, "S.D." = standard deviation; "B.P." = bubble point, which characterizes the maximum pore size of non-woven fabric; "M.F." = mean flow, which characterizes an average pore size of non-woven fabric; Distribution (of the diameters of the fibers and pore size of the fabric made therewith): "O" indicates centralized distribution, whereas "X" indicates dispersed distribution; Filtration efficiency is deduced by the distribution: "O" indicates high filtration efficiency, whereas "X" indicates low filtration efficiency; generally when the diameters of fibers are small and narrowly distributed, the pore size of fabric made with the fibers are uniform and the filtration efficiency of the fabric is high, indicated by "O"; "PDI" = polydispersity index A fourth PBT resin, Example r in Table 1, was prepared with a feed of PTA:BDO (n:n)=1:1.38 and a titanium content of 70 ppm, premixed at ta temperature of 80° C., which was fed into a vessel for esterification at 244° C. Subsequently, pre-polymerization was carried out at 245° C. under 20 mbar; and the polycondensation was later carried out at 243° C. under 1.4 mbar for polycondensation for 3.2 hours.

Two commercially available PBT resins were purchased as "Comparative Examples" 1 and 3, and "Comparative Examples" 2 and 4 were PBT resins manufactured by the

TABLE 2

A comparison of the properties of non-woven fabric of meltblown fibers made with the present PBT resin ("Example 1") and a conventional resin ("Comparative Example 1") under condition A.

| Polyester | Example 1 | Comparative Example 1 |
|---|---|---|
| Basis weight (g/m$^2$) | 20 | 20 |
| Strength of CD (kgf) | 0.331 | 0.271 |
| Strength of MD (kgf) | 0.373 | 0.188 |
| Elongation of CD (%) | 51.165 | 48.086 |

TABLE 2-continued

A comparison of the properties of non-woven fabric of meltblown fibers made with the present PBT resin ("Example 1") and a conventional resin ("Comparative Example 1") under condition A.

| Polyester | Example 1 | Comparative Example 1 |
|---|---|---|
| Elongation of MD (%) | 14.131 | 5.305 |
| Maximum Fiber Diameter (μm) | 3.887 | 3.714 |
| Minimum Fiber Diameter (μm) | 0.667 | 0.811 |
| *Average of Fiber Diameter (μm) | 1.46 | 1.799 |
| S.D. of Fiber Diameter (μm) | 0.336 | 0.502 |
| B.P. pore size (μm) | 18.9885 | 23.3576 |
| M.F. pore size (μm) | 10.5903 | 14.6877 |

"CD" = cross machine direction; "MD" = machine direction; "S.D." = standard deviation; "B.P." = bubble point, which characterizes the maximum pore size of non-woven fabric; "M.F." = mean flow, which characterizes the average pore size of non-woven fabric. Tensile properties were measured following ASTM D5034 Standard. The fiber diameter statistics were based on measurements of 110 fibers under scanning electron microscopy, SEM. The pore size was measured based on specific surface area and pore size distribution analyzer, with a testing fluid whose surface tension was 15.9 dynes/cm at 25° C.

Figure 4:
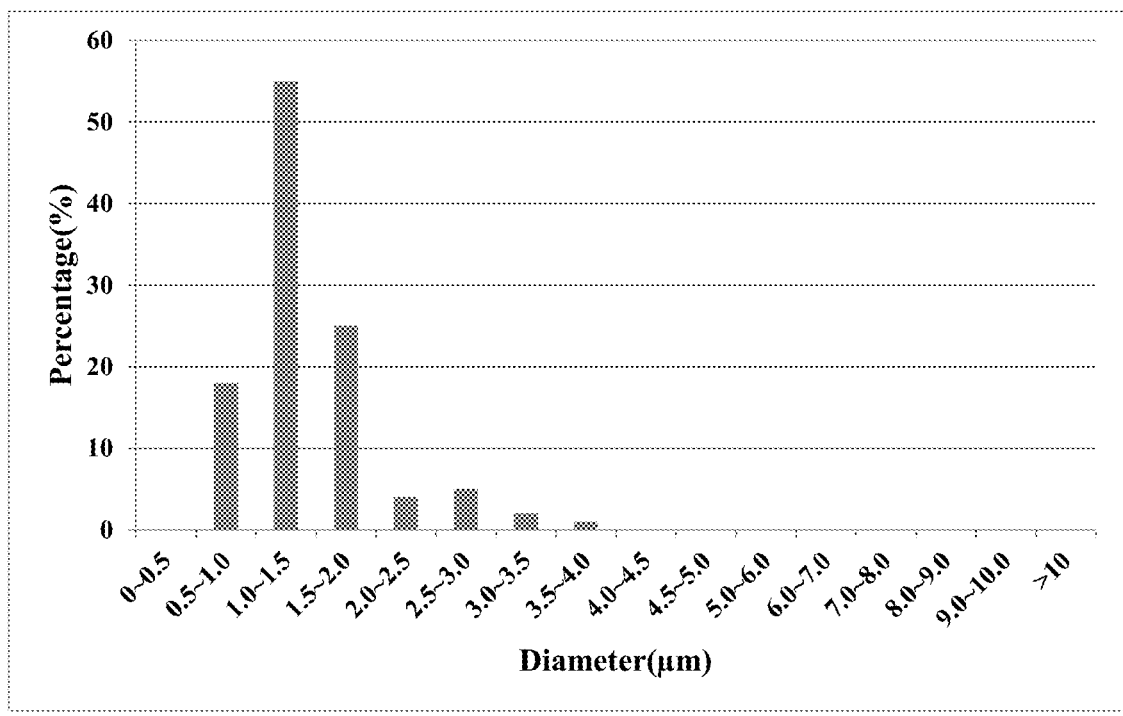
FIG. 4 is a bar graph showing the distribution of cross-sectional diameters (or thickness) of a number of 110 fibers in FIG. 3, i.e., made with the present PBT resin.

FIG. 4 demonstrates that the present PBT resin, whose IV was less than 0.6 dL/g and MVR of greater than 450 cm³/10 min, measured at 250° C. with a 2.16 kg load, with a standard deviation that is less than 4% relative to the mean value, gives meltblown fibers a more concentrated diameter distribution—more than 50% of its meltblown fibers have a diameter in the range between 1.0 μm and 1.5 μm; more than 20% are between 1.5 μm and 2.0 μm; almost 20% are between 0.5 μm and 1.0 μm; and less than 10% of the fibers are between 2.0 μm and 2.5 μm, between 2.5 μm and 3.0 μm, between 3.0 μm and 3.5 μm, or between 3.5 μm and 4.0 μm; with no detectable fibers above 4.0 μm in diameter.

Figure 5:
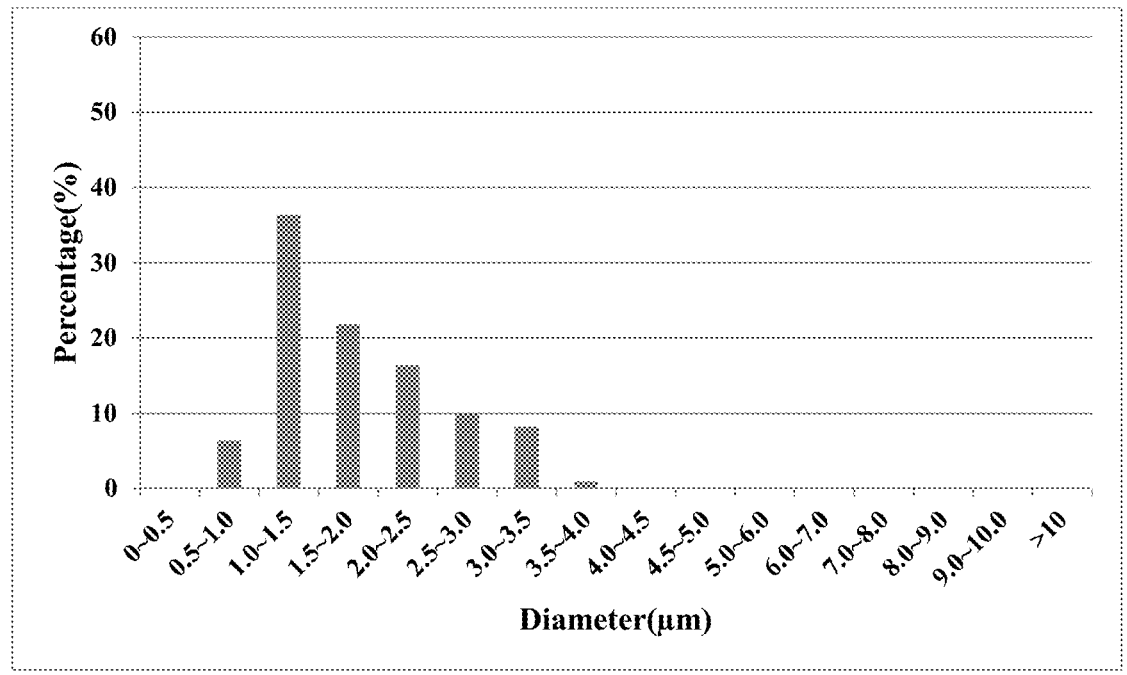
FIG. 5 is a bar graph showing the distribution of cross-sectional diameters of meltblown fibers prepared using a conventional PBT resin, under identical condition A.

In comparison to FIG. 4, FIG. 5 demonstrates that a conventional polyester resin (e.g., conventional PBT resin) gives a more dispersed diameter distribution—less than 40% of the fibers are between 1.0 μm and 1.5 μm in diameter; slightly more than 20% of the fibers are between 1.5 μm and 2.0 μm; less than 10% are between 0.5 μm and 1.0 μm; between 10% and 20% of the fibers are between 2.0 μm and 2.5 μm in diameter; about 10% of the fibers are between 2.5 μm and 3.0 μm in diameter; slightly less than 10% of the fibers are between 3.0 μm and 3.5 μm in diameter; and some fibers (less than 10%) are between 3.5 μm and 4.0 μm.

We further characterized the diameter distribution by fitting it into a Gamma distribution with parameters, shape $\alpha$ and scale $\beta$. For a variable x (herein, fiber diameter) that is gamma-distributed with a shape parameter $\alpha$ (representing distribution shape) and a scale parameter $\beta$ (representing distribution spread), i.e., denoted by $X \sim \Gamma(\alpha, \beta)$, the probability density function using the shape-scale parametrization is:

$$F(x; \alpha, \beta) = \frac{x^{\alpha-1} e^{\frac{-x}{\beta}}}{\Gamma(\alpha)\beta^\alpha} \text{ for } x > 0 \text{ and } \alpha, \beta > 0.$$

Figure 6:
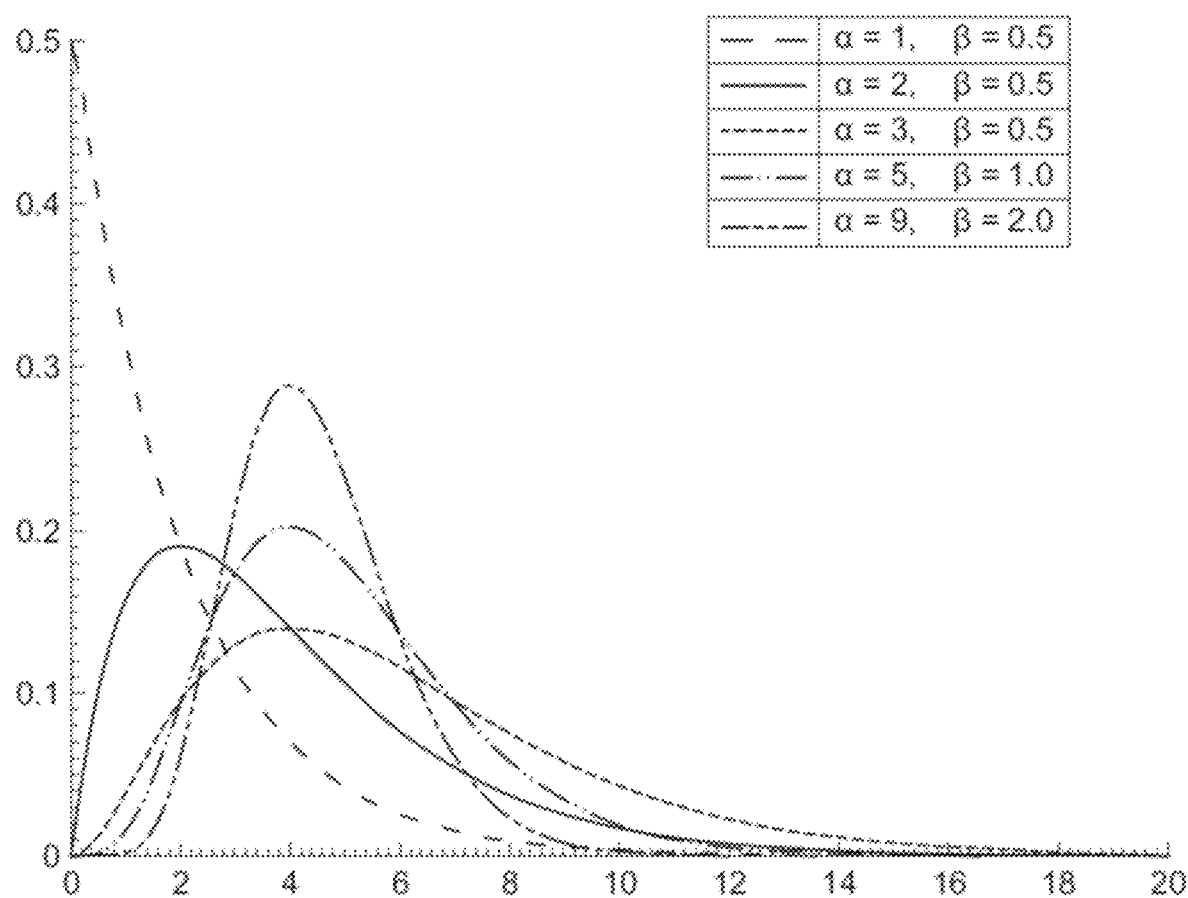
FIG. 6 is a graph showing exemplary distributions that follow Gamma distribution.

Because the scale parameter is a numerical parameter of a parametric family of probability distributions, e.g., exemplified in FIG. 6, differences between polyesters could be demonstrated by estimating the scale parameter at a same shape parameter. Generally, the larger the scale parameter, the more spread-out the distribution is.

As such, a ultra-high flowability and high stability PBT resin has been made, so that ultra-fine micron-sized fibers (~1.5 μm in diameter) can be obtained with concentrated distribution characteristic (Gamma distribution of a scale (β)<0.2). Under a same processing condition in melt blowing, both the average diameter and distribution characteristic were significantly better than conventional polyester resin. In various aspects, the high stability refers to the small variation over time, if at all, of the flowability—e.g., characterized by IV—of the presently disclosed PBT.

Figure 7:
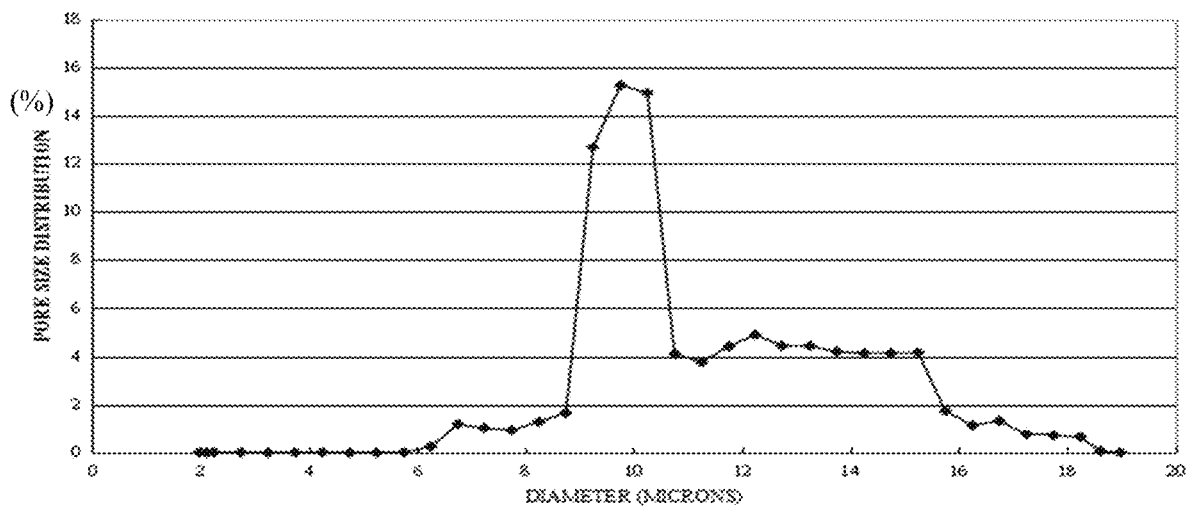
FIG. 7 is a graph showing the pore size distribution of a sheet (e.g., non-woven fabric) of a plurality of meltblown fibers made from the polyester resin of FIG. 2, where more than 40% of the pore sizes are between 9 μm and 11 μm.
Figure 8:
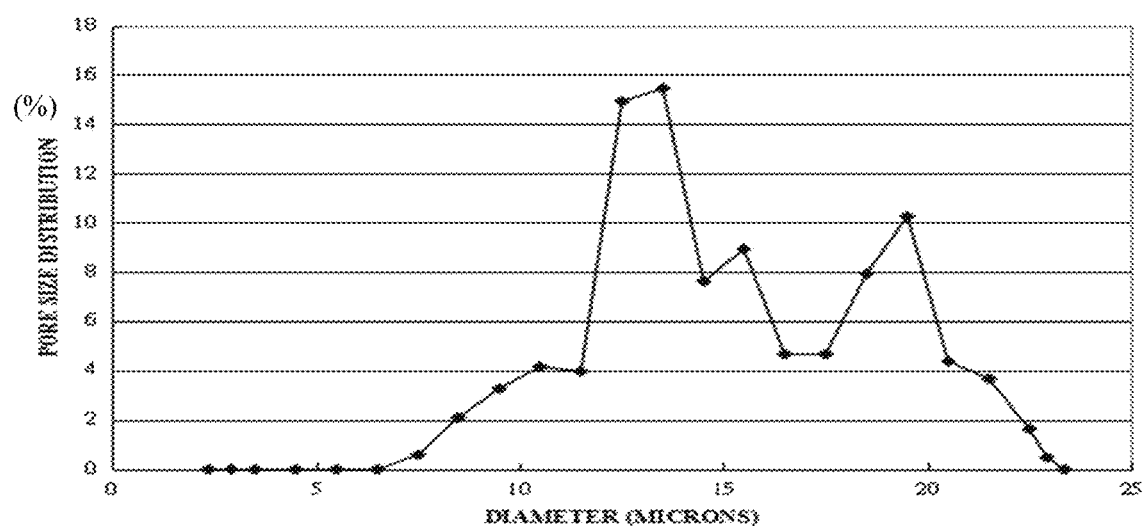
FIG. 8 is a graph showing the pore size distribution of a sheet (e.g., non-woven fabric) of a plurality of meltblown fibers made from a conventional PBT resin, under an identical meltblowing condition as that for the fibers in FIG. 7, where less than 10% of the pore sizes are between 9 μm and 11 μm, or less than 20% of the pore sizes are between 8 μm and 12 μm.

Using the presently disclosed PBT to form a single layer of a melt-blown non-woven fabric resulted in an average pore size of about 10 μm and a uniform pore size structure, which was significantly superior to the conventional polyester resin. This is seen by comparing FIG. 7 to FIG. 8.

The foregoing description of various embodiments of the invention known to the applicant at this time of filing the application has been presented and is intended for the purposes of illustration and description. The present description is not intended to be exhaustive nor limit the invention to the precise form disclosed and many modifications and variations are possible in the light of the above teachings. The embodiments described serve to explain the principles of the invention and its practical application and to enable others skilled in the art to utilize the invention in various embodiments and with various modifications as are suited to the particular use contemplated. Therefore, it is intended that the invention not be limited to the particular embodiments disclosed for carrying out the invention.

As used herein the term "comprising" or "comprises" is used in reference to compositions, methods, and respective component(s) thereof, that are useful to an embodiment, yet open to the inclusion of unspecified elements, whether useful or not. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). Although the open-ended term "comprising," as a synonym of terms such as including, containing, or having, is used herein to describe and claim the invention, the present invention, or embodiments thereof, may alternatively be described using alternative terms such as "consisting of" or "consisting essentially of."

Unless otherwise indicated, all numbers expressing quantities should be understood as modified in all instances by the term "about." The term "about" when may mean±5% (e.g., ±4%, ±3%, ±2%, ±1%) of the value being referred to.

Where a range of values is provided, each numerical value between and including the upper and lower limits of the range is contemplated as disclosed herein. It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values.

What is claimed is:

1. A polybutylene terephthalate (PBT) polymer, the PBT polymer having an intrinsic viscosity (IV) in the range of 0.45 to 0.6 dL/g and a melt volume rate (MVR) of greater than 400 cm³/10 min, measured at 250° C. with a 2.16 kg load; a Mw in the range of 28795 to 42244; a Mn in the range of 12357 to 15712; wherein, the PBT polymer used for production of fibers, the fibers diameters have a Gamma distribution with parameters of $\alpha$, where $\alpha$ represents distribution shape, and a scale parameter $\alpha$, where $\beta$ represents distribution spread, denoted by $X \sim \Gamma(\alpha,\beta)$, and for variable x, where x represents fiber diameter, satisfying the expression:

$$F(x; \alpha, \beta) = \frac{x^{\alpha-1} e^{\frac{-x}{\beta}}}{\Gamma(\alpha)\beta^\alpha}$$

where $x > 0$, $\alpha > 0$, and $0 < \beta \leq 0.2$.

2. The polybutylene terephthalate (PBT) polymer of claim 1, wherein the PBT polymer exhibits stability in flowability over time, satisfying a requirement that the MVR is measured at least twice over a period of 24 hours, during which the PBT polymer is maintained under a consistent temperature of 250° C. during the period of time between the two measurements, and a difference over time, if any, in the MVR values so measured having an arithmetic average mean value and a standard deviation, and the standard deviation is less than 4% relative to the arithmetic average mean value.

3. The polybutylene terephthalate (PBT) polymer of claim 1, wherein the PBT polymer has at least one property selected from the group consisting of a carboxylic end group (CEG) content of 15 meq/kg, or less, relative to the weight of the PBT polymer, a viscosity of less than 75 Pa·s measured at 245° C. under a shear rate of 1000 s$^{-1}$, and combinations thereof.

4. The polybutylene terephthalate (PBT) polymer of claim 1, wherein the PBT polymer has a viscosity of less than 30 Pa·s measured at 245° C. under a shear rate of 1000 s$^{-1}$.

5. The polybutylene terephthalate (PBT) polymer of claim 1, wherein the PBT polymer comprises between 70 wt. % to 99 wt. % of polybutylene terephthalate (PBT).

6. The polybutylene terephthalate (PBT) polymer of claim 1, wherein the PBT polymer has a color coordinate b* between 0 and 1.2 on CIELAB color scale.

7. The polybutylene terephthalate (PBT) polymer of claim 1, wherein the MVR is greater than 450 cm$^3$/10 min, measured at 250° C. with a 2.16 kg load.

8. The polybutylene terephthalate (PBT) polymer of claim 1, wherein the PBT polymer has a CEG content between 8 meq/kg and 12 meq/kg relative to the weight of the PBT polymer, and a viscosity of 75 Pa·s or less.

9. A resin composition, comprising the polybutylene terephthalate (PBT) polymer of claim 8 and at least one additive.

* * * * *